Figure 1:
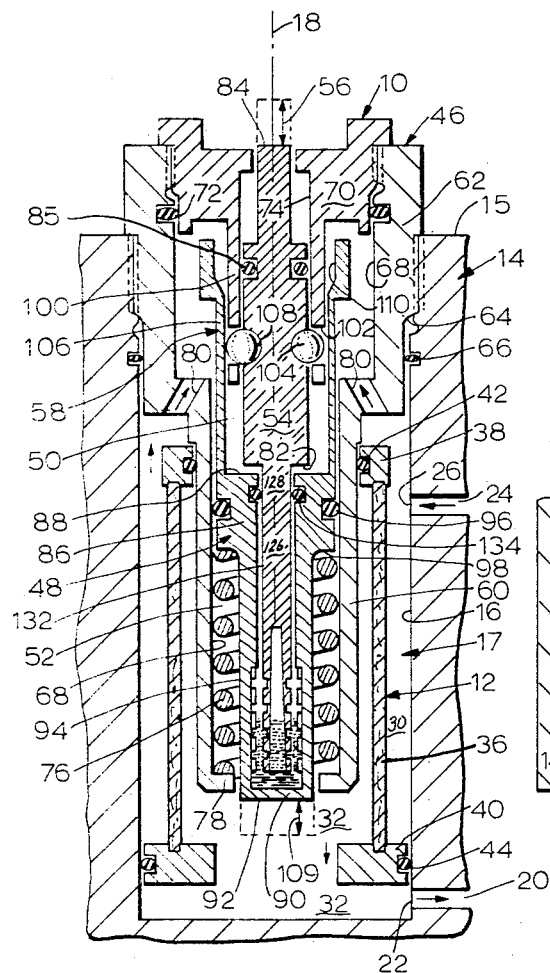

April 16, 1968  A. SCHINDEL  3,377,980

PRESSURE INDICATOR

Filed Oct. 14, 1964

ARNOLD SCHINDEL
*INVENTOR.*

BY Thomas W. Kennedy

ATTORNEY

United States Patent Office 3,377,980
Patented Apr. 16, 1968

3,377,980
PRESSURE INDICATOR
Arnold Schindel, Fair Lawn, N.J., assignor to General Precision Inc., Little Falls, N.J., a corporation of Delaware
Filed Oct. 14, 1964, Ser. No. 403,722
1 Claim. (Cl. 116—70)

The present invention relates to pressure indicators and particularly to over-pressure indicators.

A conventional over-pressure indicator is used in a hydraulic system in combination with a flow filter or like instrument for indicating a flow restriction within the instrument. The over-pressure indicator senses a substantial difference in the fluid pressure between the upstream and downstream filter passages caused by the restriction and provides a signal indicating the restriction within the filter.

The conventional over-pressure indicator comprises a cylinder containing a piston movable relative thereto and forming two variable-volume chambers, with one chamber connecting to the upstream passage and with the other chamber connecting to the downstream passage. The indicator has a plunger that is actuated at a designed level of differential pressure between the two chambers to provide a suitable signal. The indicator also has a low temperature safety latch on the plunger, which de-activates the plunger until the fluid acquires a predetermined temperature and a normal viscosity to thereby avoid sensing a false over-pressure due to high viscosity at reduced temperatures. The conventional safety latch is a metal shear pin, which is slidably received in a slot in the plunger for locking the plunger, and which is activated by a temperature-sensitive spring.

The difficulty with the aforementioned safety latch and like mechanical latches is the possibility of malfunction due to conditions such as corrosion, friction, wear, vibration, stress, metal fatigue, and hysteresis effects.

In accordance with the present invention, instrument reliability is improved by using a wholly non-mechanical safety latch rather than spring-driven metal keys.

Accordingly, it is one object of the invention to provide a high-differential pressure indicator with a reliable, low-temperature safety latch.

It is another object of the invention to provide an over-pressure indicator having a compact, reliable, low-temperature safety latch with no moving parts.

It is a further object of the invention to provide a low-temperature latch in accordance with the preceding objects which is adjustable as to actuating temperature.

To the fulfillment of these and other objects, the invention provides an over-pressure indicator comprising a cylinder having a latch means, a plunger in the cylinder maintained against displacement by said latch means, a piston in the cylinder forming a variable-volume chamber and actuating said latch means at a maximum chamber volume to release the plunger for signalling over-pressure therein, and a coupling means including water disposed in the cylinder sensing the temperature of the chamber and maintaining the piston against displacement at temperatures below the freezing point of water due to low-temperature-induced over-pressure.

Figure 2:
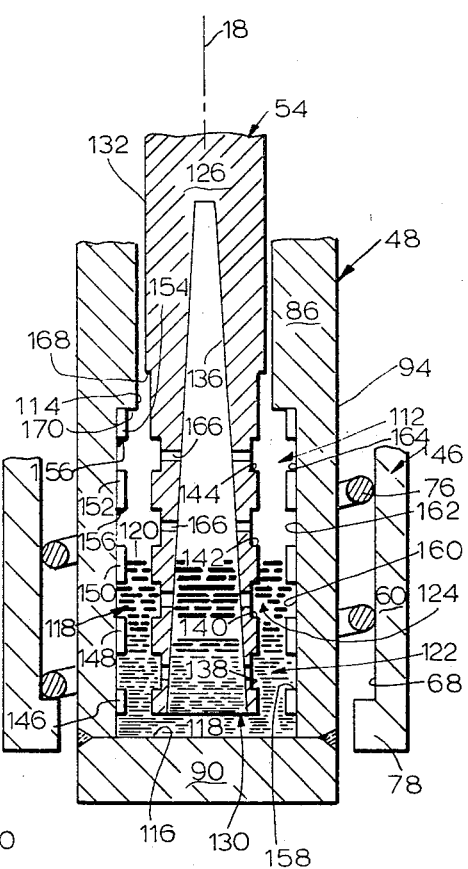

Other objects of the invention will become apparent upon reading the annexed detail description in connection with the drawings, wherein like parts are designated by like numerals throughout the several views, and wherein:

FIG. 1 is a sectional view of an over-pressure indicator and filter embodying features of the present invention; and FIG. 2 is an enlarged sectional view of a portion of FIG. 1.

Referring to FIGS. 1 and 2, one embodiment of the present invention includes an indicator 10 combined with a filter 12 and mounted in a housing 14.

Housing 14 has an exterior face 15 with a cavity 17 recessed therein. Cavity 17 has a cylindrical side wall 16 with a longitudinal axis 18, which is substantially at right angles to the exterior face 15. Housing 14 has an outlet passage 20 connecting to cavity 17 with an outlet port 22 disposed in the axially inner end of said wall 16; and housing 14 has an inlet passage 24 connecting to cavity 17 with an inlet port 26 disposed in the axially outer end of side wall 16. Cavity 17 and passages 20, 24 form a portion of a larger hydraulic system (not shown), which has a fluid flow entering cavity 17 through passage 24 and leaving through outlet passage 20.

Filter 12 divides cavity 17 into an annular inlet space 30 on the radially outer side of filter 12 communicating with inlet port 26, and a cylindrical outlet space 32 on the radially inner side of filter 28 communicating with outlet port 22.

Filter 12, which is recessed in cavity 17 coaxially therewith and axially inward of indicator 10, has a screen 36 of cylindrical shape, composed of rigid, porous material, such as wire mesh or the like, for flow therethrough from inlet space 30 to outlet space 32, and for collecting foreign particles dispersed in said fluid. Screen 36 causes a nominal pressure drop in the fluid flowing therethrough from space 30 to space 32.

Filter screen 36 has an upper ring 38, and has a lower ring 40 supported by the axially inner end of side wall 16. Ring 38 has a seal 42 on its radially inner side engaging indicator 10; and ring 40 has a seal 44 on its radially outer side engaging side wall 16.

Indicator 10, which is received in cavity 17 coaxially therewith closing the open end of said cavity 17, has a cylinder 46 of T-shape profile and of hollow construction. Indicator 10 also has a hollow piston 48 disposed therein coaxially with said cylinder 46 along axis 18, dividing cylinder 46 into an upper chamber 50 communicating with the inlet space 30 and a lower chamber 52 communicating with outlet space 32.

Indicator 10 also has a plunger 54 supported by cylinder 46 for movement relative thereto, extending into upper chamber 50 for sensing the fluid pressure therein, having a retracted position indicating a normal fluid pressure, and having an extended position indicating an excessive pressure drop across screen 36. FIG. 1 shows plunger 54 in its retracted position, and shows schematically the length of travel 56 to its extended position.

Indicator 10 also has a pressure-controlled latch means 58, disposed inside chamber 50 interconnecting plunger 54 to cylinder 46 for holding said plunger in a retracted position during normal pressure and for releasing said plunger during over-pressure in chamber 50 relative to the pressure in chamber 52 caused by a restriction in screen 36.

Cylinder 46, which is open on its axially inner end for flow between chamber 52 and outlet space 32, has a cylindrical wall 60 with a radially enlarged portion 62 removably mounted in housing 14, and with the radially outer surface 64 threaded into side wall 16 and engaging a seal 66 carried by side wall 16 to minimize leakage to the exterior from cavity 17.

Cylinder 46 also has a radially inner surface 68, and end cap 70 threaded therein at the axially outer end thereof, and a seal 72 carried by inner surface 68 engaging the adjacent surface of end cap 70. End cap 70 has an open-ended, cylindrical, coaxial bore 74, with one end opening to the exterior of housing 14 and the other end opening into chamber 50.

Cylinder 46 supports a coil spring 76 disposed in chamber 52 urging piston 48 against the fluid pressure in upper chamber 50 for providing a suitable load bias and for increasing the sensitivity of piston 48 to changes in the differential pressure between chambers 50 and 52. Cylinder 46 has an annular shoulder 78 on its radially inner surface 68 for positioning coil spring 76 inside lower chamber 52. Cylinder wall 60 has a plurality of peripherally spaced conduits 80 interconnecting upper chamber 50 to inlet space 30 for providing substantially the same fluid pressure therein.

Plunger 54, which is journaled in bore 74, has an axially inner end face 82 immersed in the fluid in upper chamber 50 and subject to fluid pressure urging it in an axially outward direction and carries a seal 85 engaging the surface of bore 74. Plunger 54 also has an axially outer end face 84 disposed on the other side of bore 74, at the outside of the housing 14, subject to atmospheric pressure, whereby plunger 54 can be displaced relative to cylinder 46 when released from its retracted position (FIG. 1) to its extended position over travel length 56.

Piston 48 has a peripheral wall 86, an end face 88 at an end of wall 86 adjacent chamber 50; and piston 48 has an end wall 90 and an end face 92 on the axially outer side of end wall 90 for sensing differential fluid pressure between chambers 50 and 52.

Piston wall 86 also has a radially outer surface 94 with a portion near end face 88 supporting a seal 96 for engaging the adjacent portion of inner surface 68 to substantially eliminate leakage between chambers 50 and 52. Wall 86 has an annular recess 98 in its radially outer surface 94 extending from end face 92 in an axially inward direction for seating coil spring 76. Piston end face 88 is integrally connected to the latch means 58, as explained hereinafter.

Latch means 58 includes an inner ring 100 of elongate shape, which is coaxial with cylinder 46. Ring 100 is fixedly connected at one end to the axially inner side of end cap 70, and concentrically surrounds plunger 54. Ring 100 also has a plurality of circular cut-outs or holes 102, equally spaced in a peripheral direction, respectively retaining a plurality of bearing balls 104, with spherical centers disposed in a plane substantially at right angles to axis 18.

Latch means 58 also includes an outer ring 106 concentric with and surrounding inner ring 100, integrally connected at one end to piston end face 88 for capturing the bearing balls 104 within the respective cut-outs 102.

Plunger 54 has a portion opposite bearing balls 104 with an annular groove 108, which is disposed in a plane substantially coplaner with said bearing balls 104 for receiving and seating the radial inner sides of said bearing balls 104 thereby interlocking plunger 54 to end cap 70. Outer ring 106 and piston 48 have a common travel length 109, as shown at the bottom end of FIG. 1.

Ring 106 has an annular recess 110 on its radially inner side disposed in a plane of symmetry which is substantially at right angles to axis 18 and substantially parallel to the plane of said bearing balls 104, and which is axially separated therefrom by a distance equal to travel length 109. With this construction, an over-pressure in chamber 50 displaces piston 48 against the fluid pressure in chamber 52 and against coil spring 76 therein, from a normal position (FIG. 1) to an over-pressure, extended position over a travel length 109, whereby recess 110 is opposite bearing balls 104 in said over-pressure position thereby releasing bearing balls 104 and plunger 54. Plunger 54 then travels a length 56 to its extended, signal position.

According to the invention, piston 48 has an inner chamber 112 formed by a radially inner surface 114 of its peripheral wall 86 and formed by an axially inner surface 116 of its end wall 90. Piston 48 is immersed in the fluid of lower chamber 52 and outlet space 32 whereby its chamber 112 has substantially the same temperature as said fluid.

Chamber 112 contains a temperature-controlled, coupling means 118, which consists of a fusible mass having a melting point in the vicinity of, or substantially below, that of pure water. Consequently, the fusible mass remains in the solid state until heated above the melting point of the particular material, which coincides generally with the attainment by the dydraulic fluid of a temperature at which its viscosity is sufficiently low to avoid a spurious over-pressure indication. In practical embodiments, the fusible mass may consist of frozen water containing, if necessary, additives to adjust the melting point to suit the particular application. Ordinarily, these additives would take the form of materials commonly used as anti-freeze agents, e.g., methanol, ethylene glycol, glycerol. Thus, by judicious selection of the additive agent and the proportion used, the fusion point can be adjusted to the needs of the particular hydraulic system in which the invention is employed. Fusible mass 118 has a surface level 120 (FIG. 2), approximately half-fills chamber 112 in its vertical orientation, and has two ice keys 122, 124.

Plunger 54 has a coaxial, cylindrical, projecting, tubular portion 126 integrally connected at its solid or closed end 128 to end face 82, and extending therefrom through chamber 50. Tube 126 also has an open end 130 disposed in chamber 112. Tube 126 is coupled at end 130 to wall 86 by ice keys 122, 124, thereby locking piston 48 to plunger 54 which is captured by latch 58, and preventing release of plunger 54 at a false over-pressure at a freezing temperature.

Tube 126 has a radially outer surface 132 with a portion thereof near end 128 engaging seal 134 carried on surface 114 of wall 86 for substantially obviating leakage from chamber 50 into chamber 112. Tube 126 also has a radially inner surface 136 with a tapered inside diameter in contact with ice block 118 near end 130.

Tube 126 has a plurality of axially spaced, shear grooves 138, 140, 142, 144 in outer surface 132. Piston 48 has a plurality of axially-spaced ring members 146, 148, 150, 152, 154 connected to tube wall 86 by welding 156 or the like, which are preferably turns of a continuous coil spring or helical strip, and which form a corresponding number of shear grooves 158, 160, 162, 164 in its inner surface 114, respectively facing said tube grooves 138, 140, 142, 144. In this way, keys 122 and 124 can be formed or molded in respective grooves 138, 158 and 140, 160.

Chamber 112 preferably has a volumetric capacity and design shape so that the same volume of liquid has a liquid surface level (FIG. 2), which is in a plane including axis 18, when indicator 10 and housing 14 are in an alternate horizontal position. In this way, in any position of indicator 10, such as vertical position, 45 degrees sloped position, or a horizontal position, fusible mass 118 has substantially the same shear area. For example, in a vertical position (FIG. 1) there are two full rings of ice keys; and in a horizontal position, there would be four half-rings of ice keys, which have substantially the same shear area as the aforementioned two full rings.

Tube 126 also has a plurality of conduits 166 extending through the wall of said tube in a radial direction opening at one end in inner surface 136 and opening at their other end in the bottoms of tube grooves 138, 140, 142, 144 for facilitating flow of the water mixture between the inside and outside surfaces of tube 126.

Tube 126 has a step 168, which is preferably beveled, disposed in its outer surface 132 adjacent groove 144, reducing its outside diameter thereat for clearing seal 134 on assembly of tube 126 into chamber 112; and chamber 112 has a step 170 in its inner surface 114 adjacent ring 154, enlarging its inside diameter for recessing rings 146, 148, 150, 152, 154 for ease of assembly of tube 126 into chamber 112.

In operation, indicator 10 normally provides a signal, indicating an over-pressure in its hydraulic system due to filter clogging. As explained heretofore, a restriction within and a pressure drop across filter 12 caused by foreign particles in its screen 36, results in a differential pressure in chambers 50 and 52 and in a displacement of piston 48 and its latch ring 106, allowing bearing balls 104 to displace radially unlatching plunger 54, which displaces from its retracted position (FIG. 1) over a travel length 56 to its signal position.

In accordance with the invention, indicator 10 also remains inactive during a freezing temperature and an abnormally high fluid viscosity causing a false over-pressure signal, which occur most frequently at system start-up. The freezing fluid temperature forms a fusible block 118 in chamber 112 with ice keys 122, 124 in grooves 138, 158 and 140, 160 to prevent a plunger signal displacement. After a designed-time interval, following start-up, due to the higher fluid temperature in cavity 17, ice keys 122, 124 are melted leaving plunger 54 disconnected for signal displacement upon the occurrence of a low-temperature-induced over-pressure in chamber 50 and space 30 relative to chamber 52 and space 32.

While the present invention has been described in a preferred embodiment, it will be obvious to those skilled in the art that various modifications can be made therein within the scope of the invention; and it is intended that the appended claim cover all such modifications.

What is claimed is:

1. An over-pressure indicator for a hydraulic system for sensing differences in fluid pressure between upstream and downstream sides of the system comprising:

a cylinder having a latch means;

a peripheral wall in said cylinder with an axis and a pair of axially spaced end walls forming a cavity with one of said end walls supporting said latch means;

a plunger in said cylinder maintained against displacement by said latch means, said plunger having an enlarged portion at one end journaled in the latch-supporting end wall coaxially with said cylinder, and has an opposite end with an elongated element projecting therefrom, said elongated element having radially outward-facing ring grooves;

a piston in said cylinder forming a variable-volume chamber and actuating said latch means at maximum chamber volume to release the plunger for signalling over-pressure, said piston being disposed in the cavity coaxially with the cylinder dividing said cylinder into a high-pressure chamber adjacent the latch-supporting wall for connection to an upstream passage and into a low-pressure chamber adjacent the other end wall for connection to a downstream passage to obtain a differential fluid pressure across the piston so as to increase the sensitivity of the piston to over-pressure, said piston having a peripheral wall and an end wall, the peripheral wall having radially inward-facing ring grooves corresponding to the radially outward-facing ring grooves on said plunger elongated element so that frozen rings can be formed in said grooves keeping the plunger to the piston;

spring means disposed in said cylinder urging displacement of the piston relative to the cylinder in a direction decreasing the chamber volume; and coupling means carried by said piston for engaging the plunger elongated element including a fusible mass disposed in said cylinder sensing the temperature of the chamber and maintaining the piston against displacement at temperatures below the freezing point of the fusible mass due to low-temperature-induced over pressure, the fusible mass in the grooves of the plunger elongated element sealingly engaging the grooves of the piston peripheral wall to form a sealed inner chamber therein containing fluid with a higher freezing temperature than the pressure chamber fluid forming a frozen block therein locking the plunger to the piston at the freezing temperature of the liquid.

References Cited
UNITED STATES PATENTS

| | | | |
|---|---|---|---|
| 2,843,077 | 7/1958 | Leefer | 116—117 |
| 3,045,826 | 7/1962 | Howard et al. | 210—90 |
| 3,119,367 | 1/1964 | Barnes et al. | 116—70 |
| 3,125,062 | 3/1964 | Raupp et al. | 116—70 |

LOUIS J. CAPOZI, *Primary Examiner.*